US007351469B2

(12) United States Patent
Beck et al.

(10) Patent No.: US 7,351,469 B2
(45) Date of Patent: Apr. 1, 2008

(54) METHOD OF PRODUCING SURFACE COATINGS ON ARTICLES, AND ARTICLE HAVING A SURFACE COATING

(75) Inventors: Udo Beck, Nürnberg (DE); Walter Oetter, Stein (DE); Gerhard Lugert, Nürnberg (DE)

(73) Assignee: Faber Castell AG, Stein (DE)

( * ) Notice: Subject to any disclaimer, the term of this patent is extended or adjusted under 35 U.S.C. 154(b) by 9 days.

(21) Appl. No.: 11/372,436

(22) Filed: Mar. 9, 2006

(65) Prior Publication Data

US 2006/0204743 A1 Sep. 14, 2006

(30) Foreign Application Priority Data

Mar. 9, 2005 (EP) .................................. 05005101

(51) Int. Cl.
*B32B 3/30* (2006.01)
*B05D 3/02* (2006.01)

(52) U.S. Cl. ...................... 428/158; 428/156; 428/170; 428/314.2; 428/323; 428/537.1; 427/373; 427/372.2; 427/180; 401/6

(58) Field of Classification Search ................ 428/156, 428/158, 170, 314.2, 323, 537.1; 427/180, 427/372.2, 373; 401/6
See application file for complete search history.

(56) References Cited

U.S. PATENT DOCUMENTS

| | | | | |
|---|---|---|---|---|
| 3,908,059 | A * | 9/1975 | Prince | 428/206 |
| 4,044,176 | A | 8/1977 | Wolinski et al. | |
| 4,771,079 | A * | 9/1988 | Melber | 521/54 |
| 5,412,049 | A * | 5/1995 | Argyropoulos et al. | 526/312 |
| 6,837,637 | B1 | 1/2005 | Beck et al. | |

FOREIGN PATENT DOCUMENTS

| | | |
|---|---|---|
| DE | 203 14 274 U1 | 7/2004 |
| GB | 1 442 823 | 7/1976 |
| JP | 4-47982 | 2/1992 |
| JP | 1-317800 | 12/1998 |
| WO | 0 376 322 A2 | 7/1990 |

* cited by examiner

*Primary Examiner*—Hai Vo
(74) *Attorney, Agent, or Firm*—Laurence A. Greenberg; Werner H. Stemer; Ralph E. Locher

(57) ABSTRACT

A method for producing surface coatings on articles, such as stick surfaces, coats at least a part of the surface with a coating. The coating has expandable particles. One surface region of the coating is treated so that the particles expand, while another surface region of the coating remains untreated. The corresponding article, such as a stick, has a surface provided at least partly with a coating with said expandable particles. The particles of the coating are expanded in one surface region thereof and unexpanded in another surface region. The former surface region projects beyond the surface of the latter surface region.

16 Claims, 3 Drawing Sheets

METHOD OF PRODUCING SURFACE COATINGS ON ARTICLES, AND ARTICLE HAVING A SURFACE COATING

BACKGROUND OF THE INVENTION

Field of the Invention

The invention relates to a process for producing surface coatings on articles, especially on sticks such as pencils and pencil-type structures, and to an article having a surface coating.

Surfaces of consumer articles are often provided with a coating, by spraying or dipping with a covering of surface-coating material, for example. A visually appealing surface on an article usually necessitates additional surface design measures. With relative frequency also it is the case that a coating is to have particular tactile properties, such as an improved grip. Applying a coherent, grip-increasing coating generally poses no particular difficulties. The situation is different if the grip of the surface is to be brought about by way of elements protruding from the surface: for example, by means of raised structures composed of slipproof materials in the form of pimples, ribs or the like.

For that purpose, British patent specification GB 1 442 823, for example, discloses applying to the surface a composition which is initially fluid but later on cures to give raised structures. In the case of the known process the applied composition comprises particles which on heating enter an expanded state and thereby enlarge the volume of the applied structures. Owing to the fluidity at the time of application, a precisely reproducible form is difficult to achieve, and leads to untolerable results especially when a pattern composed of a multiplicity of uniform structures is to be produced. Running of the applied compositions produces structures or patterns having edges which are poorly defined or merge into one another. The precise application of fluid compositions, moreover, is relatively complicated, requiring apparatus having precisely operating metering systems. A further disadvantage with the known process is that changing between different patterns entails costly and inconvenient alteration of the entire metering system. Furthermore, the design possibilities for shapes and patterns are limited.

SUMMARY OF THE INVENTION

It is thus an object of the present invention to provide a method for producing surface coatings on articles such as pencil-type sticks, and corresponding articles, which overcome the disadvantages of the above prior art, and to provide for a process with which high-quality coatings which have visual and tactile appeal and include raised regions can be produced on such articles in a technically simple way. A further object is to provide an article, and in particular a stick, having a high-quality surface coating which possesses visual and tactile appeal.

With the foregoing and further objects in view there is provided, in accordance with the invention, a method of producing a surface coating on an article, which comprises:

- providing a coating with expandable particles and applying the coating to at least one portion of a surface of the article; and
- treating a first surface region of the coating to cause the particles to expand while a second surface region of the coating remains untreated.

With the above and other objects in view there is also provided, in accordance with the invention, an article of manufacture, such as a pencil-type coated stick, comprising:

- an article body having a surface;
- a coating on at least a portion of the surface, the coating containing expandable and expanded particles;
- wherein the particles are expanded in a first surface region of the coating, the particles are unexpanded in a second surface region of the coating, and the first surface region with the expanded particles project beyond the surface of the second surface region.

In the process, there is applied at least to part of the surface a coating composition wherein there are expandable particles, one surface region of the coating being treated such that the particles expand, and another surface region of the coating remaining untreated. This procedure results in a multiplicity of design options, allowing coatings with different thickness and, consequently, raised structures for enhancing grip, for example, to be produced in a technically simple way on the surface of an article, particularly a stick of pencil, crayon or cosmetic type. This is accomplished by selective expansion of the expandable particles, preferably thermally expandable, which are included in the applied coating. The fraction of the surface regions that are in raised protrusion as a result of corresponding treatment may for example be greater than the remaining, untreated surface regions of the coating, which therefore include unexpanded particles, with the result that design elements such as patterns or indicia are recessed. In principle the degree of expansion of the particles can be controlled through corresponding duration of the respective treatment. It is therefore possible to produce raised regions with different thickness. Also conceivable is for particles to be brought to expansion only in a near-surface region of the thickness of the coating.

Expandable particles used are, in the case of one particularly preferred procedure, hollow microspheres, especially those which in the unexpanded state have an average particle size of 2 μm to 45 μm. Hollow microspheres are composed of a polymer shell which can be softened by heat and which encloses a readily evaporable liquid. On heating, the polymer material softens and the hollow microsphere is inflated by a multiple of its original size as a result of the liquid evaporating inside. The expanding hollow microspheres thus lead to an increase in the volume of the coating, producing raised structures or surface regions which exhibit increased surface roughness and grip.

Alternatively, furthermore, it is possible to conceive of using inorganic particles such as expandable mica or, in particular, expandable graphite, or particles composed of expandable plastics.

The particles are preferably expanded by the contact technique. With this technique a body heated at least to the required expansion temperature, having a contact surface which corresponds to the outline and area of the raised surface region of the coating, is brought into contact with the coating. In contrast to the known method, it is possible in this way to produce patterns of any design, including, in particular, complex patterns, featuring sharply delineated and uniform raised structures. For the purpose of heating an area of the coating that corresponds to a subsequent raised surface region, one preferred version of the process entails moving heated bodies—integrated in a lifting plunger, for instance—toward the surface of the article and, after the expansion of the particles, away from it again.

Expansion of the articles may also be effected contactlessly, by causing a high-energy light beam, such as a laser beam, to act on a region of the coating that corresponds to a raised surface region, for example. The cross-sectional area of such a light beam can likewise be specified precisely, particularly if laser light is used.

The coating can be applied in any case without problems by means for example of dipping, spraying, spreading, by the pushthrough method, or else by screen printing. The latter method is suitable, for example, when only subregions of the surface are to be provided with a coating comprising expanding particles. In the case of a pushthrough method, wood-encased sticks, for example, are inserted via an entry aperture into a container of liquid coating material, the sticks leaving the container again via an exit aperture, at which excess coating material is stripped off. In the case both of this and of other coating methods, the particles of a defined subarea region, after drying or even in the uncured state of the coating, are converted into their expanded state in the way which is appropriate in each case, in particular by exposure to heat.

The expanding particles may partly penetrate the surface of the coating, forming cracks and ridges which give rise on the one hand to an optical effect and on the other to a tactile effect. It is conceivable, for a coating with grip, to use a material which is itself slip-fast or grippy. The primary purpose of the expanded particles in such a case is to form raised subarea regions or structures and to increase the grip further by means, for instance, of the aforementioned formation of cracks and ridges. Alternatively it is conceivable for the particles to be expanded, preferably contactlessly, when the coating material has still not fully hardened—for example, when it is still in a viscous state. A possible result might be raised surface regions wherein the expanded particles do not penetrate the surface of the coating but are covered with coating material.

In the case of sticks or other articles with a round or oval cross section—for instance, tool handles such as paintbrush or hammer handles—the contact technique referred to above can be modified such that the article to be treated having a round or oval cross section is rolled off on a surface of a body disposed on which there are contact surfaces having at least the expansion temperature of the particles. This rolling technique allows raised structures to be produced in complex patterns in a technically very simple way.

An article which achieves the object referred to at the outset has at least on part of its surface a coating comprising expandable particles, the particles of the coating being expanded in one surface region thereof and unexpanded in another surface region, and the former surface region projecting beyond the surface of the latter surface region. In other words, the former surface region has a greater thickness than the latter surface region. As already outlined earlier on above, attention should be drawn not only to the advantageous, simple production but also, in particular, to the degree of design freedom for surface designs. For example, the respective fraction of the raised and unraised subarea regions may vary. Raised coating regions may form, for instance, by far the greater part of the coated area; in other words, the elements of the coated surface that characterize taste are formed, as already mentioned earlier on above, by recesses in the form, for example, of an indicium. Another design possibility consists in the coating material and the admixed particles having different colorations. This allows raised and unraised or recessed surface subregions having markedly different colored appearance to be produced.

The design effects can be employed with particular advantage, in the case of mass-produced stick products such as pencils, crayons, and cosmetic sticks. This is true in particular of wood-encased sticks. Expandable particles are preferably hollow microspheres, having in the initial state an average particle size of 5-20 μm and being enlarged by at least twofold in the expanded state.

Other features which are considered as characteristic for the invention are set forth in the appended claims.

Although the invention is illustrated and described herein as embodied in a production of surface coatings on articles, especially sticks, and article having a surface coating, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
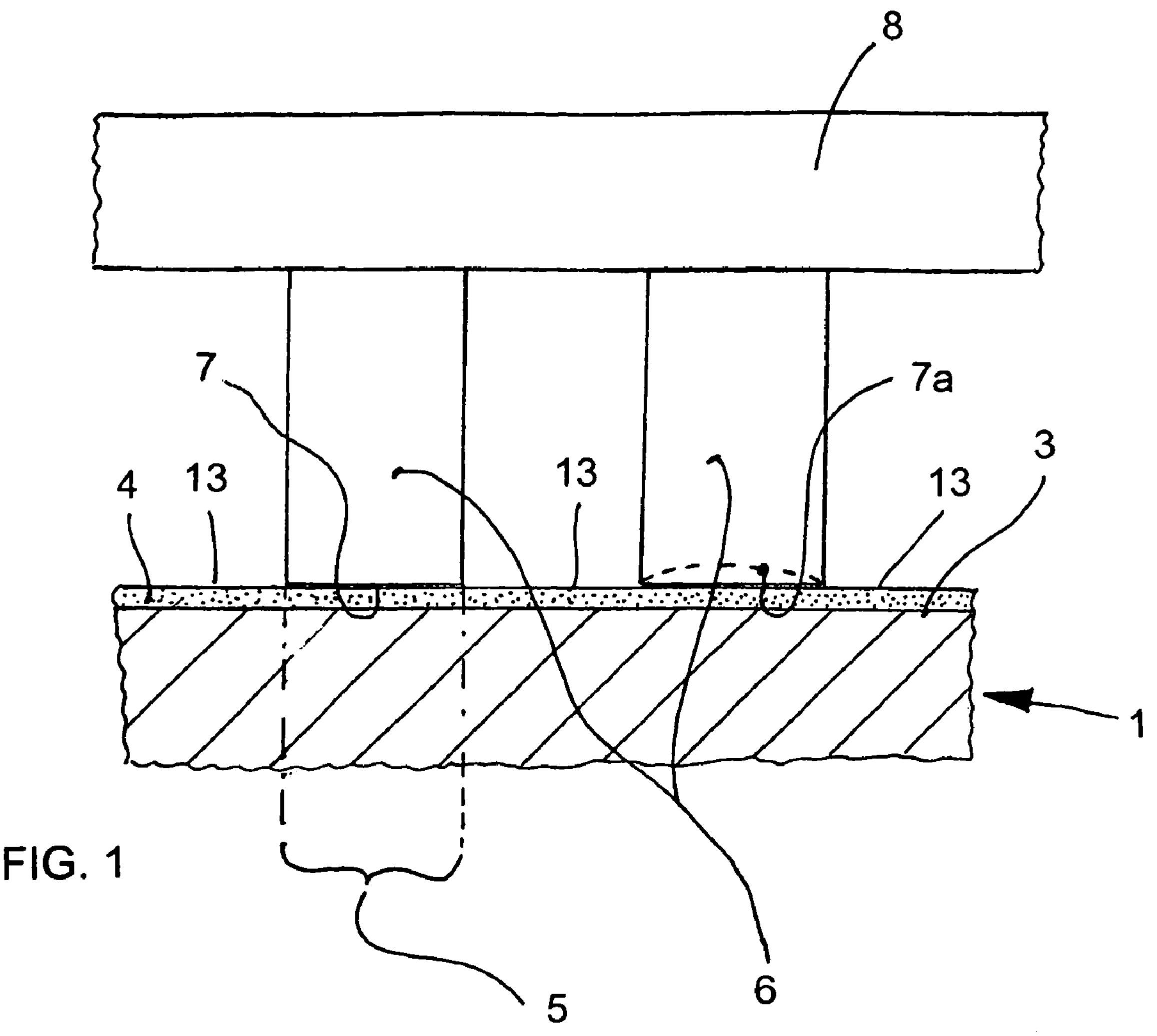
FIG. 1 is a diagrammatic cross section through a surface region of an article, a stick for example, which illustrates the thermal treatment of an expandable, particle-containing coating by a contact technique.
Figure 2:
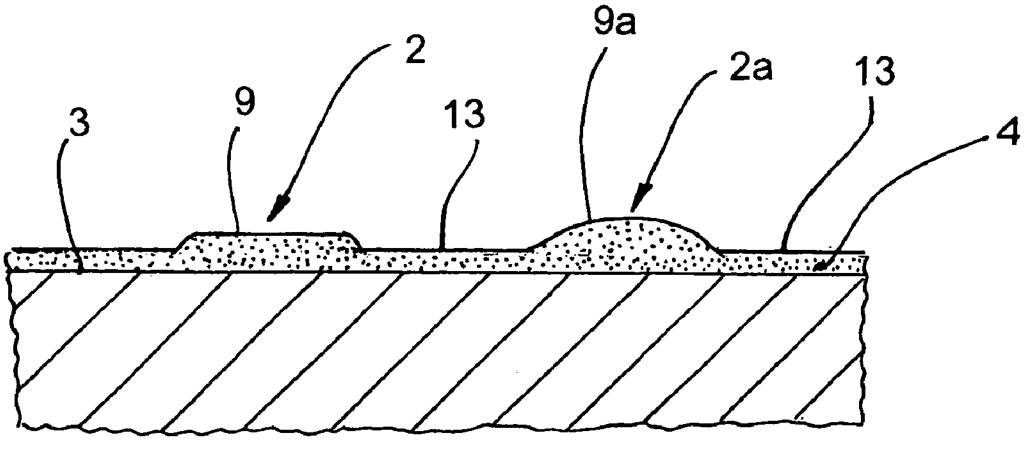
FIG. 2 illustrates the particular surface region of FIG. 1 after the thermal treatment.

Referring now to the figures of the drawing in detail and first, to FIG. 1 thereof, there is shown a wood-encased stick 1—with raised structures or surface regions 2, 2*a*. First, a coating 4 comprising expandable particles, hollow microspheres for example, is applied either to the entire surface 3 or to a subarea 3*a* (FIG. 3) of the article body, or substrate body. In this case it is possible, for example, to use hollow microspheres having a jacket of copolymer (CAS No. 25214), which are available from Akzo Nobel Chemicals GmbH, of Emmerich, Germany. The starting material used for the coating may for instance be a preparation in accordance with the examples given later on below. In the case of a stick 1 which is to be provided in its entirety with a coating 4 it is advantageous to use the pushthrough method already briefly outlined earlier on above. If, on the other hand, only subareas 3*a* are to be provided with a coating 4 comprising expandable particles, as in the case of the stick 1*a* shown in FIG. 3, for instance, this can be done, for example, by a screen printing method. When the coating 4 has hardened, selective expansion is performed. For this purpose an area 5 of the surface 3 or of the coating 4 is heated to a temperature which lies above the expansion temperature of the particular particles used. The size of the area 5 corresponds to a subsequent raised surface region 2, 2*a*. Other areas or surface regions 13 of the coating 4 remain untreated, i.e., their particles retain their original, unexpanded state. If, as shown in FIG. 1, the contact technique is employed for the expansion of the particles, a body 6 heated at least to the respective expansion temperature and having a contact surface 7 corresponding to a raised surface region 2, 2*a*, is brought into contact with the coating 4. If a multiplicity of raised structures 2, 2*a* are to be produced, a corresponding number of bodies 6 are needed. These may all be disposed on a common carrier 8, in one or more rows for example. The contact surface 7 is adapted essentially to the contour of the surface to be treated—in the case of a stick, for example, it is curved cylindrically in the same way as the surface of the stick. The cross-sectional form of a raised surface region 2, 2*a* can be influenced to a certain extent by the form of the contact surface 7. As is illustrated in FIG. 2, the top face of a surface region 2 may be shaped to correspond approximately to the surface of the pin 1; that is, it extends approximately coaxially with respect to the stick surface 3. Also conceivable, however, is a convex (for example) shaping of a raised surface region 2*a*. A design of this kind is assisted, for instance, by means of a complementary—that is, a concavely shaped—contact surface 7*a*.

Figure 3:
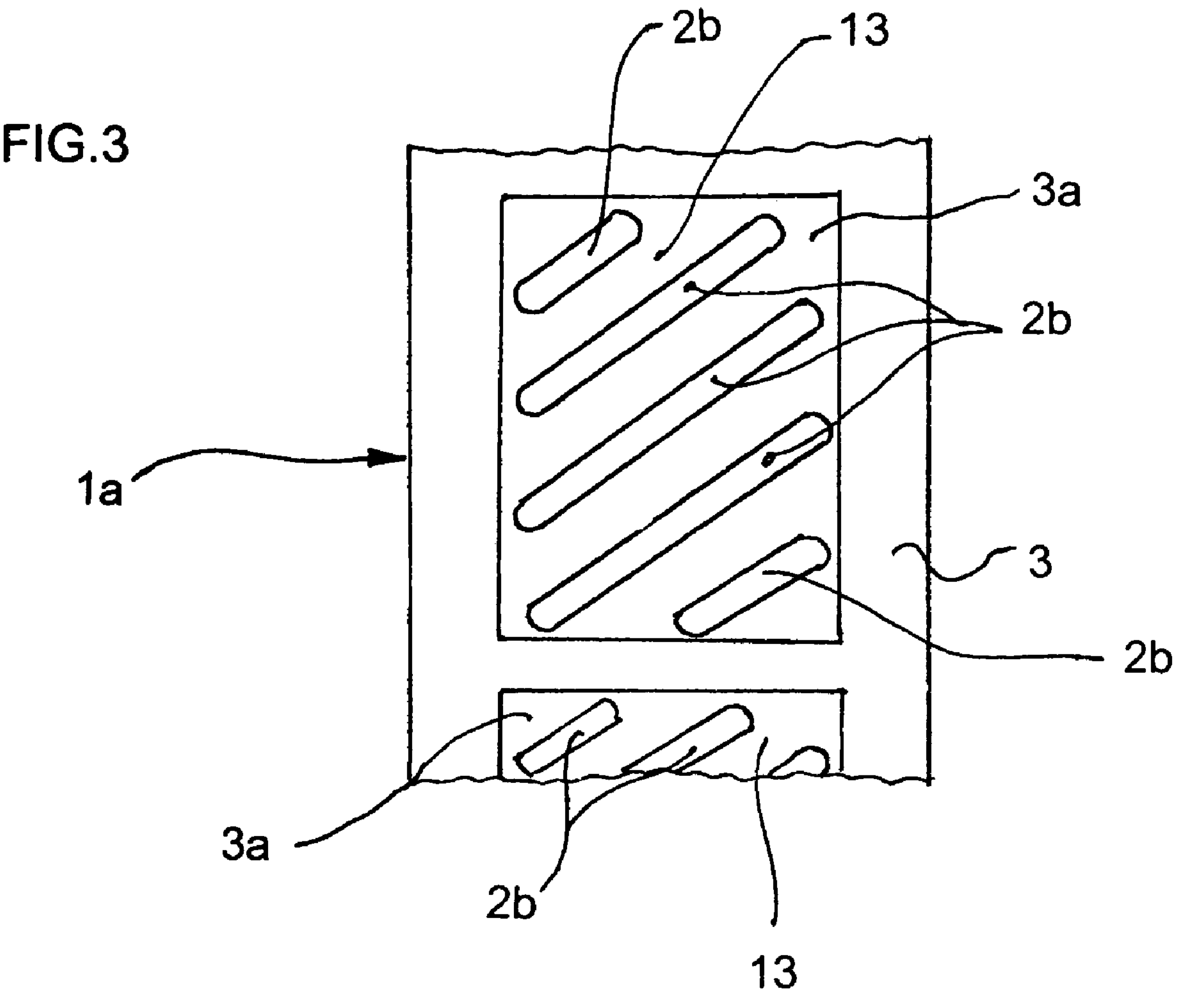
FIG. 3 is a plan view of a stick only part of whose surface has been provided with a coating comprising expandable particles.

In the case of the stick 1*a* of FIG. 3, subareas 3*a* of its surface 3 have been provided by means of a screen printing method or otherwise with a coating 4. Within the subareas 3*a* and the coating 4 thereon there are respectively raised structures and surface regions 2*b* which have been produced, for example, with the above-described contact technique.

Figure 4:
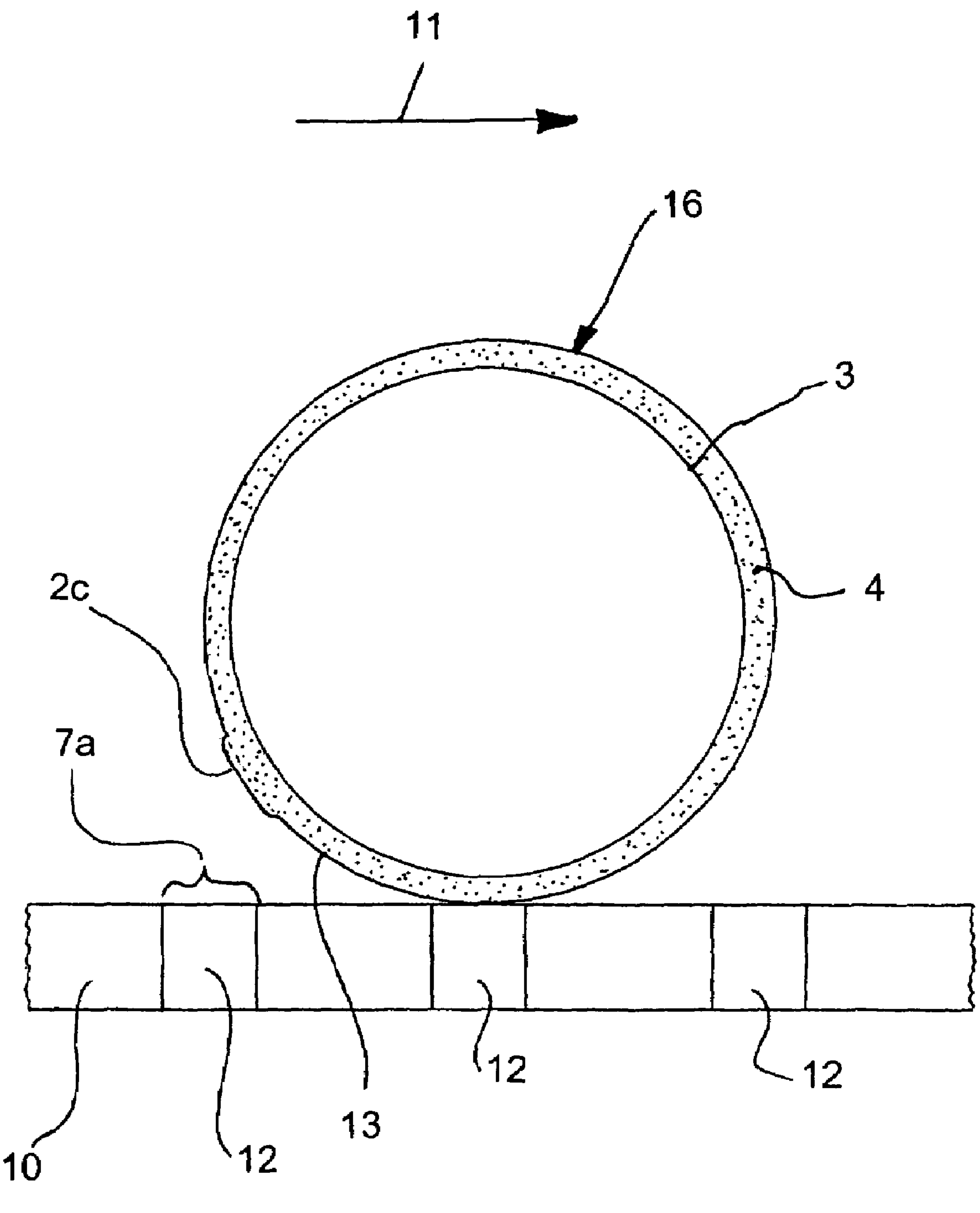
FIG. 4 is a diagrammatic cross section depicting an exemplary embodiment of the contact technique according to FIG. 1.

FIG. 4 depicts, diagrammatically, a process version wherein a cylindrical article, such as a stick 1*b*, is rolled on the surface of a tool 10—which has a plate form, for example—in the direction of the arrow 11, in order to initiate particle expansion in defined surface regions. For this purpose the tool accommodates heating elements 12 which correspond to heated bodies and which have a contact surface 7*a* which is flush with the surface of the tool. The heating elements 12 are arranged in a grid which corresponds to the subsequent pattern of the raised structures produced. Their contact surface 7*a* corresponds to the size of the raised surface regions 2*c* that are to be produced. The respectively required relative speed between the stick 1*b* and the tool 10 depends on the desired contact period between the coating 4 and a heating element 12. Thermal treatment in the coating 4 can also be effected by keeping the stick stationary and rotatable about its lengthwise center axis, with the tool 10, for example, being moved in the direction of the arrow 11.

Examples of suitable coatings include the following formulas (percentages are by weight):

EXAMPLE 1

Water-based coating material suitable for the pushthrough method

| | | |
|---|---|---|
| binder: aqueous polyurethane dispersion (Alberdingk APU 1061) | 1) | 83% |
| polyurethane thickener (Rheolate 255) | 2) | 1% |
| polyurethane thickener (Rheolate 244) | 2) | 2.3% |
| dispersing additive (Disperbyk-192) | 3) | 1% |
| expandable hollow microspheres (Expancel 551 DU40) | 4) | 9% |
| wetting agent (Tego Wet 510) | 5) | 0.3% |
| mineral oil-based defoamer (Drewplus T 4202) | 6) | 0.4% |
| aqueous pigment formulation (Levanyl Blue G-LF) | 7) | 3% |

EXAMPLE 2

Colorless, water-based topcoat material

| | | |
|---|---|---|
| binder: aqueous polyurethane dispersion (Alberdingk U 210) | 1) | 80% |
| expandable hollow microspheres (Expancel 820 SL 40) | 4) | 18% |
| polyurethane thickener (Rheolate 244) | 2) | 1.5% |
| thickener (DSX 3290) | 8) | 0.2% |
| mineral oil-based defoamer (Drewplus T 4202) | 6) | 0.3% |

EXAMPLE 3

Colored, UV-curable coating material

| | | |
|---|---|---|
| UV binder: (Genomer 1343) | 9) | 13% |
| polymerization inhibitor (Genorad 16) | 9) | 0.3% |
| UV binder: (Genomer 5275) | 9) | 11% |
| thickener (Aerosil 380) | 10) | 0.3% |
| UV binder, (Speciality Resin 01-554) | 9) | 16% |
| UV photoinitiator (Irgacure 819) | 11) | 1% |
| UV photoinitiator (Irgacure 1173) | 11) | 2% |
| UV pigment formulation, (Microlith Black C-K) | 11) | 0.5% |
| defoamer (Byk 020) | 3) | 0.2% |
| softfeel additive (Daiplacoat RHC-731 Clear) | 12) | 11% |
| matting agent (Syloid Rad 2105) | 13) | 3% |
| UV binder, (Genomer 6050/TM) | 9) | 29% |
| expandable hollow microspheres (Expancel 551 DU 40) | 4) | 12.7% |

EXAMPLE 4

Colorless, solvent-borne topcoat material

| | | |
|---|---|---|
| binder (nitrocellulose H 22) | 14) | 19% |
| plasticizer based on tributyl citrate (Citrofol A 1) | 4) | 5% |
| resin binder, (Kunstharz SK) | 15) | 6% |
| solvent (acetone) | 16) | 60% |
| expandable hollow spheres (Expancel 091 DU 120) | 4) | 10% |

EXAMPLE 5

Colored, water-based coating material suitable for screen printing

| | | |
|---|---|---|
| binder: aqueous polyurethane dispersion (Liopur 97-282) | 17) | 50.6% |
| Polyurethane thickener (Rheolate 244) | 2) | 3% |
| aqueous pigment formulation (Levanyl Blue G-LF) | 7) | 0.7% |
| aqueous pigment formulation (Levanox white RNZ-SF) | 7) | 5% |
| solvent (1,2-propanediol) | 18) | 10% |
| defoamer (EFKA 2526) | 19) | 0.7% |
| expandable hollow microspheres (Expancel 091 DU 140) | 4) | 30% |

Manufacturers:
1) Alberdingk Boley GmbH, D-47829 Krefeld (DE)
2) Elementis, Ambachtsweg 8, 4906 CH Oosterhout (NL)
3) Byk Chemie GmbH, D-46462 Wesel (DE)
4) Akzo Nobel Chemicals GmbH, D-46446 Emmerich (DE)
5) Tego Chemie Service GmbH, D-45127 Essen (DE)
6) Drew Ameroid Deutschland GmbH, D-63073 Offenbach (DE)
7) Bayer AG, D-51368 Leverkussen (DE)
8) Cognis Deutschland GmbH, D-40551 Dësseldorf (DE)
9) Rahn AG, CH-8050 Zurich (CH)
10) Degussa AG, D-60287 Frankfurt am Main (DE)
11) Ciba, CH-4002 Basle (CH)
12) Gustav Grolman GmbH & Co. KG, D-41468 Neuss (DE)
13) Grace Davison Europe, D-67547 Worms (DE)
14) Hagedorn AG, D-49078 Osnabrück (DE)
15) Degussa Hüls/Creanova Spezialchemie GmbH, D-53859 Niederkassel (DE)
16) Biesterfeld Spezialchemie GmbH, D-20095 Hamburg (DE)
17) Synthopol Chemie, D-21605 Buxehude (DE)
18) Merck KGaA, D-64293 Darmstadt (DE)
19) EFKA Additives B.V., 8440 AN Heerenveen (NL)

This application claims the priority, under 35 U.S.C. § 119, of European patent application No. 05 005 101.0, filed Mar. 9, 2005; the entire disclosure of the prior application is herewith incorporated by reference.

We Claim:

1. A method of producing a surface coating on an article, which comprises:

providing an article, providing a coating with thermally expandable particles and applying the coating to at least one portion of a surface of the article; and heating a first partial surface region of the coating to cause the particles to expand while a second partial surface region of the coating remains unheated, to thereby cause the first partial surface region with the expanded particles to project beyond a surface of the second partial surface region with unexpanded particles to form a raised pattern relative to the second partial surface region, with the expanded particles in the first partial surface region having a greater particle size than the unexpanded particles in the second partial surface region.

2. The method according to claim 1, which comprises providing the coating with thermally expandable hollow microspheres.

3. The method according to claim 2, wherein the hollow microspheres have an average size of 2 μm to 45 μm in an unexpanded state thereof.

4. The method according to claim 1, wherein the heating step comprises heating an area corresponding to a desired raised surface region by contacting the area with a contact surface of a body heated to at least an expansion temperature of the thermally expandable particles.

5. The method according to claim 4, which comprises moving the body for heating the area toward the surface and, after the expansion of the particles, away from the surface.

6. The method according to claim 5, which comprises coating and heating a cross-sectionally triangular or hexagonal articles.

7. The method according to claim 5, which comprises coating and heating a cross-sectionally triangular or hexagonal sticks.

8. The method according to claim 4, which comprises rolling an article having a round or oval cross section over a surface of a tool formed with contact surfaces heated to at least the expansion temperature of the particles.

9. The method according to claim 1, which comprises generating raised surface regions on the surface of a wood-encased stick.

10. An article, comprising:

an article body having a surface;

a coating of expandable particles formed on at least a portion of said surface;

wherein said expandable particles are expanded in a first partial surface region of said coating, said expandable particles remaining in an unexpanded form in a second partial surface region of said coating, with said expanded particles in said first partial surface region having a greater particle size than said unexpanded particles in said second partial surface region and said first surface region with said expanded particles project beyond the surface of said second surface region and form a raised structure relative to said second partial surface region.

11. The article according to claim 10, wherein said article body is a stick.

12. The article according to claim 10, wherein said article body is a wood-encased stick.

13. The article according to claim 10, wherein said article body is a pencil-type stick.

14. The article according to claim 10, wherein said expandable and/or expanded particles of said coating are hollow microspheres.

15. The article according to claim 14, wherein said hollow microspheres have an average particle size of 5-45 μm in an initial state thereof, and said microspheres are enlarged at least twofold in an expanded state.

16. The article according to claim 10, wherein a proportion of surface regions with expanded particles is greater than a proportion of surface regions with unexpanded particles.

* * * * *